UNITED STATES PATENT OFFICE.

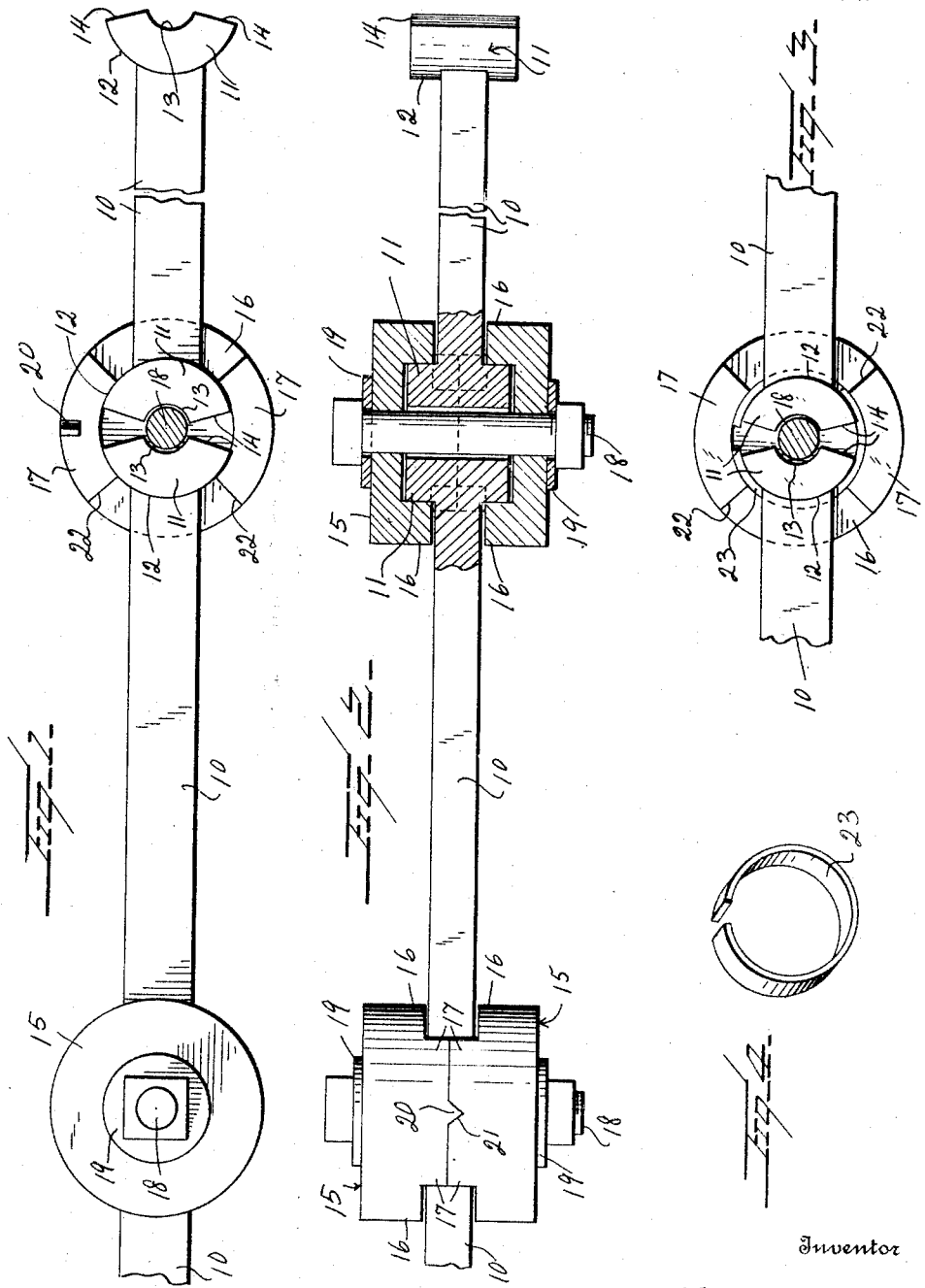

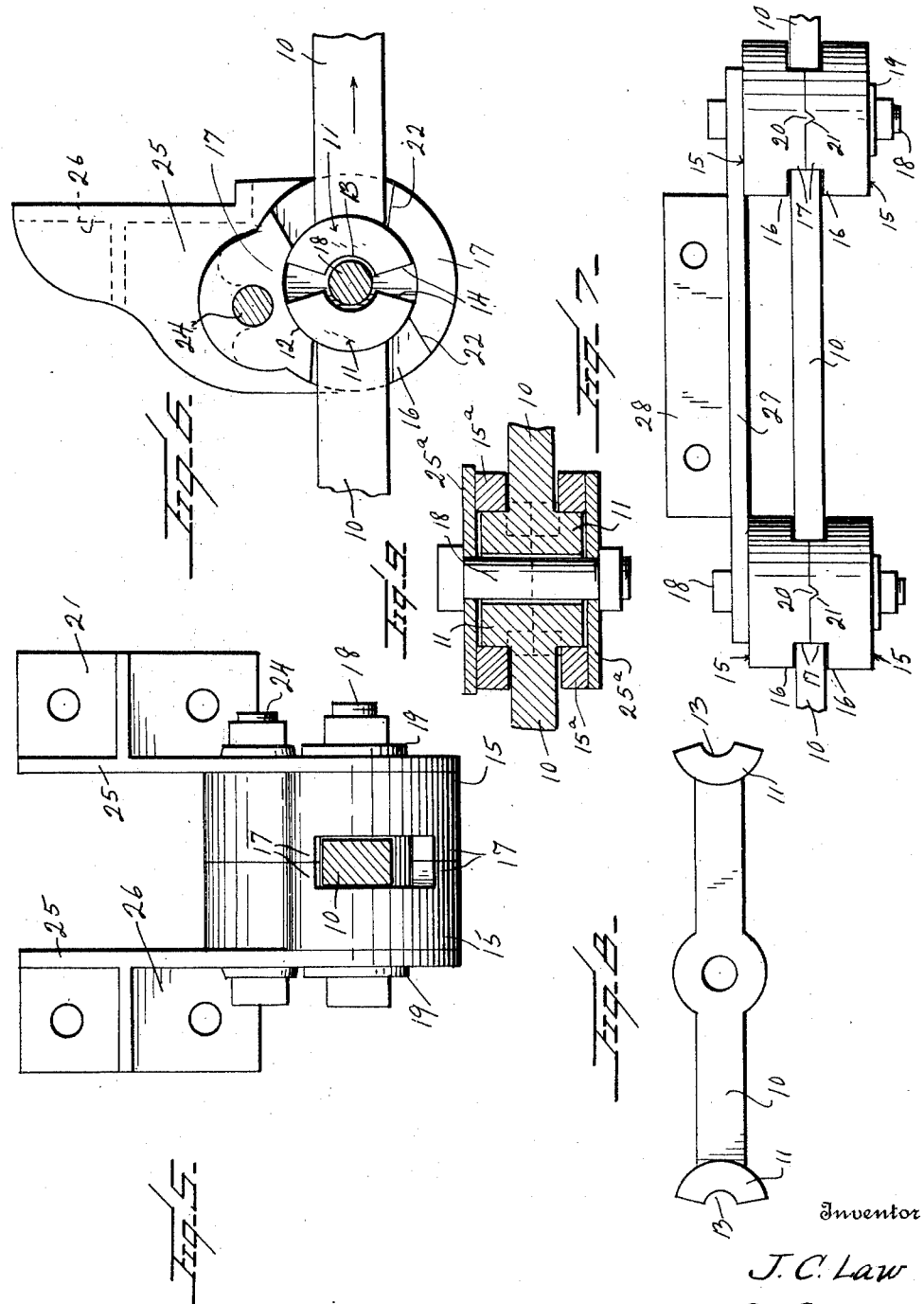

JAMES C. LAW, OF BINGHAMTON, NEW YORK.

SINGLE-BAR HEAVY-DUTY CHAIN.

1,366,126. Specification of Letters Patent. Patented Jan. 18, 1921.

Application filed April 7, 1920. Serial No. 372,073.

*To all whom it may concern:*

Be it known that I, JAMES C. LAW, a citizen of the United States, residing at Binghamton, in the county of Broome and State of New York, have invented certain new and useful Improvements in Single-Bar Heavy-Duty Chains, of which the following is a specification, reference being had to the accompanying drawings.

This invention relates to drive chains or conveyer chains in the nature of sprocket chains which are used in large plants for the purpose of driving machinery, carrying scrapers or conveyer buckets, and particularly the invention relates to the means for connecting one link of the chain to the next link.

Heretofore, as far as I am aware, the links of all chains of this nature have been connected by transversely extending bolts which form the pivots upon which the two connected links oscillate, these bolts sustaining the whole strain between the links.

The general object of my invention is to provide a chain in which the links are not connected to each other by a transverse bolt or pivoting element, but in which the links are connected by two annular elements disposed at the joint of the links and connected by a transverse bolt, upon which, however, no pulling strain comes.

A further object is to provide a chain, the links of which consist of single bars, each of said bars having laterally projecting heads at its ends, and provide members at the joints between said links with which said heads engage, said members being in the nature of link heads as distinguished from pivot links.

A further object is to provide a heavy duty conveyer, elevator, car haul or like chain wherein the chain consists of links of the single bar type and connected at the joints by annular connecting members with which said heads engage, said connecting members being held in operative position by a transverse bolt upon which no pulling strain comes, the several elements of the chain being so formed that they may be connected or disconnected with the least possible adjustment of the chain take-up.

A further object is to provide a chain construction which permits the chain, when worn out of chain pitch, to be restored to almost full pitch.

A further object is to provide means whereby conveyer blades, buckets or like attachments may be readily connected to the chain either at the junction between the links to the link connecting members or to the links themselves.

Other objects and advantages will hereafter appear in the following description.

My invention is illustrated in the accompanying drawings, wherein:—

Figure 1 is a side elevation of a chain constructed in accordance with my invention, one of the disks 15 being removed and the corresponding bolt being shown in section;

Fig. 2 is a top plan view of the chain shown in Fig. 1, one joint between two links being in section;

Fig. 3 is a side elevation of the chain with one of the connecting disks removed showing the use of a liner for compensating for wear;

Fig. 4 is a perspective view of the liner;

Fig. 5 is a sectional view through a link bar looking toward the joint between two links and showing the attachment supporting brackets mounted thereon;

Fig. 6 is a side elevation of the construction shown in Fig. 5, one of the disks and brackets being removed;

Fig. 7 is a fragmentary top plan view showing the manner in which another form of flight or bucket attachment may be connected to the chain;

Fig. 8 is a side elevation of a modified form of link providing for wheels or attachments to be fastened to the links proper;

Fig. 9 is a diametrical sectional view through the joint between two links showing a modification of the joint.

Referring to these drawings, it will be seen that my chain is made up of a series of links 10 which are preferably rectangular in section, though they may be of other forms in cross section, these links being disposed in alinement with each other end for end, and each link being formed at its opposite ends with heads 11. These heads, as illustrated in Fig. 2, extend laterally on each side beyond the side faces of the link bar 10, and the heads have a form in cross section of the segment of a circle, the outer faces of the heads being convexly curved from the top to the bottom of the head, as at 12, while the end face of the head may be formed with a transverse concavity 13 connected by inclined faces 14 to the outer face 12 of the head. The heads on both ends of the link are alike.

Coacting with these links 10 and holding them together are a pair of connecting members 15. Each connecting member consists of a solid metal, annular disk formed upon its inner face with an inwardly projecting, annular flange 16. At opposite points in the diameter of the disk, these flanges 16 are further inwardly extended, as at 17, to form arcuate spacing lugs. When the two members 15 are disposed on each side of the joint between the pair of links, these spacing flanges 17 on one member 15 will abut against the spacing flanges on the other member 15. The members 15 are detachably engaged with each other and upon the heads 11 of the links by a transversely extending bolt 18, this bolt passing through washers 19 bearing against the outer faces of the disk-like members 15.

Preferably, the lugs 17 of the two confronting members 15 will be provided, one with a locking tooth 20, and the other with a corresponding recess 21 in which the locking tooth engages, thus preventing any rotation of the disks relative to each other and thus keeping the abutting spacing lugs 17 of the two disks in alinement with each other. It will be seen that the end faces of the lugs 17 are radially extended, as at 22, and that the space between the radial faces 22 of one pair of lugs and the radial faces of the other pair of lugs constitutes a segmental opening within which the bar of the corresponding link may play or move into various angular relations to the axis of the bolt 18.

When the heads of the bar links 10 are disposed as illustrated in Fig. 2 and the connecting members 15 are connected over the heads 11 of the links and fastened by the bolt 18, it is obvious that the inner concave face of the annular flange 16 will constitute a bearing against which the convex faces 12 of the heads of the links operate and bear, and that with this construction a pair of links 10 may have angular relation to each other within certain limits, depending upon the length of the lug 17, while at the same time they are held in interlinked engagement with each other. Furthermore, it will be seen, and, of course, it is particularly important that no pulling strain comes upon the bolt 18, the only strain coming upon this bolt being that of the nut on the bolt which holds the disks with the confronting faces of the lugs 17 in abutting engagement. It is also to be understood that the chamber formed within the confronting members 15 has a width transversely of the chain sufficient to secure a proper fit of the heads 11 within this chamber but not such as will cause undue friction and wear. The only wear to which the heads will be subjected is the wear of the ends of the heads against the annular flanges 16 and the wear of the inner faces of these flanges, and one of the advantages of my invention resides in the fact that this wear can be compensated for or taken up by the provision of split ring liners or bushings, designated 23 in Fig. 3, which have a width equal to the width of an annular flange 16 and adapted to fit against the inner face of this annular flange. These bushings are made preferably of spring steel and may be readily disposed within the connecting members 15 for the purpose of restoring the chain to pitch when the heads 11 or the inner faces of the flanges 16 are unduly worn so that the chain is out of pitch. It is obvious that these bushings may be renewed from time to time whenever necessary and may be increased in thickness as the outer convex faces of the heads wear down. Thus, it is obvious that the life of the chain may be very greatly prolonged and at the same time the chain kept in working order and at proper pitch by these liners or bushings.

In Figs. 5 and 6 and 7 I show means whereby flight, scraper or bucket attachments may be readily supported in place at intervals on the chain, and where this is to be done connecting members 15 are used which are in all respects the same as the connecting members 15 previously described, except that one of the lugs 17 is radially extended, and through the lugs of each pair of connecting members 15 extends a bolt hole or recess adapted to receive a bolt 24 so that thus there are two bolts 18 and 24 holding the disk-like members 15 in engagement with each other and in engagement with the links. Scraper or bucket supporting brackets 25 are disposed against the outside faces of the members 15 and through these brackets the bolts 18 and 24 pass. Each of these brackets, as illustrated in Fig. 5, may be formed with a flange 26 to which the scraper blade or the bucket or other attachment may be bolted, riveted or otherwise attached. Of course, I have merely shown a particular form of flight brackets in Fig. 6 in order to illustrate the manner in which such brackets may be attached to the disks 15. I do not wish to be limited to the particular form of such brackets or the particular attachment so connected to the disks 15.

It will be also noted from Fig. 6 that as the disks may oscillate forward and backward to a slight degree when engaging the links and forming part of a chain, the pressure against the flight or scraper blade attached to the brackets 25 throws the disks back to the position shown in Fig. 6, with the ends of the solid lugs 17 resting against the bar of the rearward link 10. This construction permits the ready removal of the brackets 25 and their replacement at any time and, of course, does not interfere with the ready removal of the disks 15 from engagement with the heads 11 of the links and the positioning within the disks of the wearing liners previously referred to or the replacement of broken links. Of course, the middle portion of each link may be so formed as to provide for bolting rollers or other attachments thereto, as illustrated in Fig. 8, and does not obviously interfere or change in any manner the way of connecting the links to each other by the connecting members 15.

In Fig. 7 I show how bucket attachments may be connected to the pitch centers of the chain. Such a bucket attachment is designated 27 and extends longitudinally of and parallel to one of the links 10 and at its ends is connected to the disks by means of the bolt 18, this bar 27 having a flange 28 to which a bucket may be fastened. This is merely another illustration of the fact that attachments may be readily connected to a chain of this character without altering the operation of the connecting means between the joints of the links. It will be understood, of course, that while I have illustrated in Fig. 6 the attachment brackets as extending upward from the chain, they might extend outward therefrom, or at various angles.

This chain is particularly adapted to be driven by a double sprocket wheel, the sprocket wheel engaging on each side of the bar links 10 and engaging with the peripheries of the pairs of disks in an obvious manner. Thus the advantages of a double sprocket gear drive may be readily secured. The links are forged or cast of steel or other metal in one piece. The disks or connecting members 15 are preferably circular, but may also be an oval shape, and these disks are preferably of forged steel but may also be of cast steel or malleable iron. The bolts are preferably of steel.

It is to be particularly noted that a chain of this construction provides the greatest possible bearing surface per square inch between the connecting members 15 and the bar links without, however, there being any bearing or any pulling strain on the bolts or pins connecting the pairs of disks. Furthermore, it permits the very ready adjustment or repair of the chain and the ready assembling or disassembling of the chain. The particular advantage of a chain of the single bar type is that when operating as a conveyer, the material conveyed tends to fall away from the chain and is not carried to the sprocket wheels by the chain, with the possibility of this material accumulating on the sprockets and throwing the chain off therefrom or causing the breaking of the sprocket teeth or the links. This accident is not infrequent where chains of the side and middle bar type are used. A further advantage, as pointed out, is that when the chain is worn out of chain pitch, this pitch may be restored to almost full pitch by inserting the washers or liners 23. (See Fig. 3.) These liners are preferably of high carbon steel, but may be cut from steel tubing or made of bronze, brass or other metal.

The shape of the disk-like connecting members 15 may be varied and may be circular, oval, elliptical or any other desired shape so as to have attachments bolted or riveted thereto, but it is essential that these pairs of disks shall each have at opposite points inwardly projecting flanges having a concave inner face against which the convex outer faces of the link heads may bear. It will be seen that a chain constructed in accordance with my invention has, as a matter of fact, no bearing pins or bolts at all, the provision of the bolt, pin or rivet 18 being simply to hold the disks together, and that in a chain of my construction the bearing of the links is on the outer face of the head of the link instead of on an inner face, as it may be termed, that is the face defining an eye. Thus, as the circle described by the outer face shall be from 75% to 85% larger than the circle of an eye through which the bolt 18 would normally pass, it is obvious that I secure a very large bearing surface per square inch and yet at the same time so construct the chain that it may be quickly connected up or disconnected in order to replace or repair a broken link or attachment without requiring any release of the chain take-up or at the most not requiring a release of the chain take-up in excess of the diameter of the center bolt or rivet to relieve the tension on the chain.

It will likewise be noted that the disks with their inwardly extending flanges 15 and the confronting lugs 17 entirely house the heads of the links, and that with the construction illustrated in Fig. 1, the bars are ordinarily never rotated to a position where these heads will pass beyond the ends of the lugs 17 so that dirt can enter into the chamber formed by the disks or members 15, and this further provides for a very easy lubrication of the various parts, as this chamber inclosed by the disks or heads will tend to hold lubricant. Of course, it is obvious that where the links are designed to move through a relatively great angular distance, the spaces between the lugs 17 may be enlarged, that is the lugs may be made less in length and the heads may be correspondingly less in length. The chain may be made very cheaply, as there are very few parts and none of these expensive or difficult to make.

In Fig. 9 I show a modification of my construction wherein the disks on each side of the joint between the two bar links are open all way through, in other words have the form of annuli, these annuli being designated 15ª and being the equivalent of the disks 15. The outer ends of these annuli are, of course, closed but not by a permanent web, as in the construction shown in Figs. 1 and 2, but by a plate. I have illustrated these plates as being formed by the flight brackets 25, these plates, therefore, being designated 25ª. Otherwise than this, the construction of the joint is the same as that heretofore described. This construction permits the members 15ª to be made relatively light, and obviously embodies the same principle as the constructions illustrated in the remaining figures. While in Fig. 6 I have illustrated in full lines the disks 15 as having an opening for the passage of the bolt 24, yet it will be obvious that these members 15 might be notched for the passage of the bolt 24 as illustrated in dotted lines in Fig. 6.

I am aware that in the Dodge patents, #234,548 and #229,978, there is shown a chain construction composed of links with bearing lugs on two sides, the side bars being held together by a plurality of cross studs or rivets, and that in these patents bearings are taken on the outbearings or lugs of the middle link in both instances. In these patents, however, the single bar links are connected to each other by two laterally disposed links having the same pitch as the single bar links and connected by rivets. In this construction the chains are driven by means of sprocket teeth which engage between the pairs of connecting links, that is between the links of each pair, and these teeth bear on the rivets connecting these pairs of links. My construction is such that a double sprocket wheel is used, the teeth of which engage against the peripheries of the disks 15. The chains shown in these Dodge patents are composed of single links set alternately with relation to pairs of connecting links, whereas my chain is entirely a single bar chain. Furthermore, in the Dodge chains the heads of the single links are not entirely housed and protected from dirt and foreign matter as in my construction, nor are the double links held spaced apart from each other by relatively large surfaces as in my construction.

I claim:—

1. A chain including alined bar links, each link having laterally projecting heads at its opposite ends, the faces of said heads on each side of the bar being convex, a pair of oppositely disposed connecting members at the joint of each link, each connecting member having an inwardly projecting curved flange with which the head rotatively engages, the curvature of the flange being approximately the same in curvature as the face of the head, and a single means engaging the members with each other and extending transversely between the confronting heads of the bar links.

2. A chain including bar links, each link having laterally projecting heads at its opposite ends, the faces of said heads on each side of the bar being convex, a pair of oppositely disposed, approximately circular connecting members at the joint of each link, each connecting member having an inwardly projecting curved flange with which the head rotatively engages, the curvature of the flange being approximately the same in curvature as the face of the head, and means engaging the members with each other and comprising a pin passing through the said members and through the space between the confronting ends of the heads of the two links.

3. A chain including bar links, each link having at its ends laterally projecting heads, arcuate in section, to provide oppositely directed convex faces, connecting means for said links comprising oppositely disposed members each formed with an annular flange on its inner face, between which flanges the links project and with the inner face of which flanges the heads engage, said members having means for spacing them apart, and means engaging the members with each other.

4. A chain including bar links, each link having at its ends laterally projecting heads, arcuate in section, to provide oppositely directed convex faces, connecting means for said links comprising oppositely disposed members each formed with an annular flange on its inner face, between which flanges the links project and with the inner face of which flanges the heads engage, said members having means for spacing them apart, and a pin passing through the centers of said members and engaging the members with each other and being disposed between the confronting concave end faces of the heads.

5. A chain including bar links, each link having at its ends laterally projecting heads, arcuate in section, to provide oppositely directed convex faces, connecting means for said links comprising oppositely disposed members each formed with an annular flange on its inner face, between which flanges the links project and with the inner face of which flanges the heads engage, the confronting faces of said members having projecting spacing lugs abutting against each other whereby to hold said members in spaced relation, certain of the coacting lugs on the abutting members being formed to have interlocking engagement to prevent independent rotation of said members with relation to each other, and a pin connecting said members passing through the center of the same between the heads of the links.

6. A chain including bar links having laterally projecting heads, the oppositely directed faces of adjacent heads being convexly curved, connecting members disposed one on each side of the joint between said links and each having an inwardly extending, annular flange and inwardly extending abutting lugs, the heads of the links being disposed within the flange and the curved face of the links engaging the inner face of the flange, said members each having a central bolt passage and said members having a transverse passage extending through confronting lugs, brackets disposed against the outside faces of said members and bolts passing through said brackets and through the central passage and the second named passage in said members.

7. A chain including bar links having laterally projecting heads, arcuate in cross section, the oppositely directed faces of the heads of adjacent links being convexly curved, oppositely disposed connecting members, one on each side of the joint of the link, said members having inwardly projecting curved flanges engaging over said heads, the inner faces of said flanges having a curvature corresponding to the curvature of the confronting faces of the heads, means for connecting said members, said means not engaging the links, and detachable bearing liners disposed within said flanges and bearing against the same and against which the convex faces of said heads bear.

8. A chain including bar links having laterally projecting heads, arcuate in cross section, the oppositely directed faces of the heads of adjacent links being convexly curved, oppositely disposed connecting members, one on each side of the joint of the link, said members having inwardly projecting curved flanges engaging over said heads, the inner faces of said flanges having a curvature corresponding to the curvature of the confronting faces of the heads, means for connecting said members, said means not engaging the links, and detachable bearing liners disposed within said flanges and bearing against the same and against which the convex faces of said heads bear, said liners being resilient and being split.

9. A chain including two alined bar links, each link having laterally projecting, sector-shaped heads, the faces of said heads on each side of the bar being convex, a pair of oppositely disposed connecting members disposed at the joint between the links and with which the heads of the two links have swinging engagement, and a single connecting means connecting said members and holding them in engagement with the adjacent heads and extending between the confronting end faces of the said adjacent heads.

In testimony whereof I hereunto affix my signature.

JAMES C. LAW.